Patented Jan. 3, 1939

2,142,125

UNITED STATES PATENT OFFICE 2,142,125

ETHERS OF GLYCOL MONO-ARYLOXY-ACETATES

Ernest F. Grether, Midland, Mich., assignor to The Dow Chemical Company, Midland, Mich., a corporation of Michigan No Drawing. Application December 4, 1936, Serial No. 114,229

11 Claims. (Cl. 106—40)

The present invention concerns ethers of glycol monoaryloxy-acetates and plastic compositions comprising the same.

I have found that the ethers of the glycol mono-aryloxy-acetates are viscous, water-white liquids, or low melting solids and that they are particularly valuable as plasticizers for cellulose derivatives by virtue of their high boiling points, low volatilities, insolubility in water, and resistance to hydrolysis, decomposition by heat, and discoloration by light.

The invention then consists in the new compounds and compositions comprising the same hereinafter described and particularly pointed out in the claims.

The herein described ethers of glycol mono-aryloxy-acetates may be prepared by heating a mixture of an aryloxy-acetic acid and a glycol mono-ether to a temperature at which reaction occurs, and thereafter separating the ether-ester product from the reacted mixture, e. g. by fractional distillation, crystallization, etc. The aryloxy-acetic acid and glycol mono-ether may be employed in any desired proportions, although I generally employ a molar excess of the glycol mono-ether. The reaction proceeds most smoothly and rapidly at temperatures between 100° and 180° C. but may be carried out at somewhat lower or higher temperatures, if desired. During the reaction water vapor is evolved, which is removed from the reaction zone. For convenience the reaction is usually carried out at atmospheric or slightly higher pressure, but may also be carried out with advantage under vacuum to facilitate the removal of water from the mixture, whereby a more rapid and complete reaction may be obtained. Ordinarily the reaction is substantially complete in about 2 to 10 hours under the conditions above described.

In a modification of this method the ethers of the glycol mono-aryloxy-acetates may be prepared by reacting together an aryloxy-acetic acid and a glycol substantially as described to form a glycol-mono-aryloxy-acetate and thereafter etherifying said mono-acetate product with an alcohol, phenol, etc.

If desired, a catalyst such as an inorganic acid, e. g. sulphuric acid; acid salt, e. g. sodium acid sulphate; aromatic sulphonic acids, etc., may be employed in the above method to promote rapid reaction at relatively low temperatures, but the reaction proceeds smoothly and rapidly in the absence of such catalysts under the conditions described above.

The following examples describe the preparation of certain of our new ether-ester compounds and plastic compositions comprising the same, but are not to be construed as limiting the invention.

Example 1

A mixture of 152 grams (1.0 mol) of phenoxy-acetic acid and 100 grams (1.31 mols) of methoxy-ethanol, i. e. mono-methyl ether of ethylene glycol, and 4 grams of benzene sulfonic acid was heated to a temperature of 100° C. Water was distilled out of the reaction zone as formed in the reaction and the heating continued to 100°–108° C. for approximately 3 hours, i. e. until water vapor was no longer evolved. The reacted mixture was then washed with water and fractionally distilled, whereby there was obtained 183 grams (0.87 mol) of the methyl ether of ethylene glycol mono-phenoxy-acetate as a water white liquid boiling at 137°–138° C. at 3 millimeters pressure, and having the specific gravity 1.144 at 20°/4° C.

Example 2

In a similar manner 608 grams (4.0 mols) of phenoxy-acetic acid, 450 grams (5.0) mols of ethoxy-ethanol, and 8 grams of benzene sulfonic acid were reacted together at a temperature of 110°–133° C. over a period of 4 hours. Upon fractional distillation of the crude reaction mixture, there was obtained 800 grams (3.57 mols) of the ethyl ether of ethylene glycol mono-phenoxy-acetate as a water white liquid boiling between 130° and 135° C. at 2 millimeters pressure, and having a specific gravity of 1.111 at 20°/4° C.

Example 3

456 grams (3.0 mols) of phenoxy-acetic acid, 375 grams (3.5 mols) of butoxy-ethanol, and 6 grams of benzene sulfonic acid were mixed together and heated at temperatures gradually increasing from 135° C. to 145° C. over a period of 2 hours, water being removed from the reaction zone as formed. Fractional distillation of the reacted mixture resulted in the recovery of 36 grams of unreacted phenoxy-acetic acid and the isolation of 623 grams (2.51 mols) of the butyl ether of ethylene glycol mono-phenoxy-acetate as a free-flowing liquid boiling at 138°–139° C. at 3 millimeters pressure, and having a specific gravity of 1.063 at 20°/4° C.

Example 4

93 grams (0.5 mol) of 2-chloro-phenoxy-acetic acid was reacted with 75 grams (0.83 mol) of ethoxy-ethanol in the presence of 1 gram of benzene sulfonic acid. The reaction mixture was maintained at temperatures gradually increasing from 120° C. to 130° C. over a period of 3 hours. The major product of the reaction consisted in the ethyl-ether of ethylene glycol mono-2-chloro-phenoxy-acetate which is a water white liquid boiling at approximately 161° C. at 5 millimeters pressure, and having a specific gravity of 1.200 at 20°/4° C.

Example 5

A mixture of 88 grams (0.58 mol) of phenoxy-acetic acid, 100 grams (0.58 mol) of the 2-chloro-phenyl ether of ethylene glycol, and 5 grams of benzene sulfonic acid was maintained at a reaction temperature of 130°–160° C. for 2 hours, substantially as described. The reaction mixture was thereafter poured into an excess of 95 per cent ethyl alcohol, whereby the desired ester product was precipitated. The precipitate was separated by filtration, washed with cold ethyl alcohol, and air-dried. 135 grams (0.44 mol) of the 2-chloro-phenyl ether of ethylene glycol mono-phenoxy acetate was thereby obtained as a white crystalline solid having a melting point of approximately 44° C.

Other mono-ethers of the glycols may be substituted for those shown in the examples to form compounds such as the phenyl ether of propylene glycol mono-phenoxy-acetate, the benzyl ether of ethylene glycol mono-2-chloro-phenoxy-acetate, the cyclohexyl ether of butylene glycol mono-phenoxy-acetate, etc. In a similar manner other aryloxy-acetic acids may be employed in the reaction whereby there are formed compounds such as the ethyl ether of ethylene glycol mono-2-phenyl phenoxy acetate, the 2-chloro-phenyl ether of ethylene glycol mono-ortho-cresoxy-acetate, the ethyl ether of ethylene glycol mono-betal-naphthoxy-acetate, etc. By substituting mixtures of reactants for the pure compounds employed in the examples, mixtures of ether-ester derivatives of the glycols may be obtained as permanent liquids, compatible with cellulose derivatives, readily soluble in the common organic solvents, and having low volatilities.

The following examples illustrate the use of the ethers of glycol-mono-aryloxy-acetates in cellulose derivative compositions:

Example 6

11 parts by weight of an ethyl cellulose having a 47.5 per cent ethoxy content, and 7 parts by weight of ethyl ether of ethylene glycol mono-phenoxy-acetate were dissolved in 82 parts of a solvent mixture consisting of 67 per cent of benzene and 33 per cent of ethyl alcohol by volume. A foil 0.026 inch thick was cast from this solution on a continuous belt in a film casting machine. This foil, containing approximately 40 per cent by weight of the ether ester plasticizer, was highly flexible, retaining its flexibility at low temperatures, and being adapted for use in producing a laminated safety glass.

Example 7

Films of ethyl cellulose were prepared, some containing up to 15 per cent by weight of the ether of ethylene glycol mono-phenoxy-acetate and others an equivalent amount of the ethyl ether of ethylene glycol mono-2-chloro-phenoxy-acetate. These films showed no yellowing effect after a 72-hour exposure to the light from a carbon arc in a standard testing apparatus known as a "fadeometer".

Example 8

A solution was prepared containing:

| | Parts |
|---|---|
| Cellulose acetate | 10 |
| Acetone | 63 |
| Dioxane | 18 |
| Mono-methyl ether of ethylene glycol | 9 |
| Methyl ether of ethylene glycol mono-phenoxy acetate | 3.3 |

This composition was employed in the preparation of clear foils of excellent flexibility.

Example 9

8 parts of ester gum, 10 parts of one-half second nitro-cellulose, and 4 parts of the ethyl ether of ethylene glycol mono-phenoxy acetate were dissolved in 78 parts of a solvent mixture consisting of:

| | Parts |
|---|---|
| Toluene | 54.6 |
| Ethyl acetate | 11.7 |
| Ethyl alcohol | 3.9 |
| Glycol mono-ethyl ether | 3.9 |
| Methyl ether of ethylene glycol acetate | 3.9 |

This composition was found suitable as a lacquer for spray application.

Example 10

Foils cast from a composition consisting of:

| | Parts |
|---|---|
| Benzyl cellulose | 10 |
| Ethyl ether of ethylene glycol mono-ortho-chloro-phenoxy acetate | 5 |
| Toluene | 67 |
| Butanol | 9 |
| Butyl acetate | 9 | were found to be flexible and soft in nature and to have desirable adhesive characteristics. Substitution of 2.5 parts of the ortho-chloro-phenyl ether of ethylene glycol mono-phenoxy acetate for the 5 parts of the ethyl ether of ethylene glycol mono-ortho-chloro-phenoxy acetate, as shown above, resulted in a composition from which flexible foils of increased hardness were likewise prepared.

Example 11

10 parts of titanium dioxide was suspended in a solution consisting of:

| | Parts |
|---|---|
| Benzene | 20.1 |
| Methanol | 9.9 |
| Ethyl ether of ethylene glycol mono-phenoxy acetate | 20 |

100 parts of ethyl cellulose was thereafter incorporated with the suspension and carefully kneaded to secure good dispersion of the pigment and plasticizer therein. The resulting mixture was then freed of solvent on calender rolls and the sheet obtained thereby formed into plastic shapes in the usual manner.

Cellulose derivative compositions containing other ethers of the glycol mono-aryloxy-acetates may be prepared in a like manner and employed as lacquers and coating compositions, and in the preparation of filaments, plastic articles, threads, etc.

Other modes of applying the principle of my invention may be employed instead of those explained, change being made as regards the steps or products herein disclosed, provided the step or steps or the products recited in the following claims be thereby carried out or obtained.

I, therefore, particularly point out and distinctly claim as my invention:—

1. A plastic composition comprising a cellulose derivative and an ether of a glycol mono-aryloxy-acetate.

2. A plastic composition comprising a cellulose derivative and an ether of an ethylene glycol mono-aryloxy-acetate.

3. A plastic composition comprising a cellulose ether and an ether of an ethylene glycol mono-aryloxy-acetate.

4. A plastic composition comprising a cellulose ether and an alkyl ether of an ethylene glycol mono-aryloxy-acetate.

5. A plastic composition comprising a cellulose ether and an ethyl ether of an ethylene glycol mono-aryloxy-acetate.

6. A plastic composition comprising ethyl cellulose and an ether of a glycol mono-aryloxy-acetate.

7. A plastic composition comprising ethyl cellulose and an ether of an ethylene glycol mono-aryloxy-acetate.

8. A plastic composition comprising ethyl cellulose and an alkyl ether of an ethylene glycol mono-aryloxy-acetate.

9. A plastic composition comprising ethyl cellulose and an ethyl ether of an ethylene glycol mono-aryloxy-acetate.

10. A plastic composition comprising ethyl cellulose and an ether of ethylene glycol mono-phenoxy-acetate.

11. A plastic composition comprising ethyl cellulose and an alkyl ether of ethylene glycol mono-phenoxy-acetate.

ERNEST F. GRETHER.